(12) United States Patent
Tseng et al.

(10) Patent No.: US 11,338,879 B2
(45) Date of Patent: May 24, 2022

(54) COUPLING MECHANISM FOR A VEHICLE BODY

(71) Applicant: LI YUAN TRANSMISSION CO., LTD., Nantou County (TW)

(72) Inventors: Chyuan-Yow Tseng, Nantou County (TW); Keng-Yu Ko, Nantou County (TW); Yu-Sheng Chen, Nantou County (TW)

(73) Assignee: LI YUAN TRANSMISSION CO., LTD., Nantou County (TW)

( * ) Notice: Subject to any disclaimer, the term of this patent is extended or adjusted under 35 U.S.C. 154(b) by 42 days.

(21) Appl. No.: 16/931,491

(22) Filed: Jul. 17, 2020

(65) Prior Publication Data
US 2021/0024166 A1  Jan. 28, 2021

(30) Foreign Application Priority Data

Jul. 23, 2019 (TW) .................................. 108126029

(51) Int. Cl.
| | | |
|---|---|---|
| *B62K 5/10* | (2013.01) | |
| *B60G 21/00* | (2006.01) | |
| *B62K 5/06* | (2006.01) | |
| *B62K 5/027* | (2013.01) | |

(52) U.S. Cl.
CPC .............. *B62K 5/10* (2013.01); *B60G 21/007* (2013.01); *B62K 5/06* (2013.01); *B60G 2300/122* (2013.01); *B62K 5/027* (2013.01)

(58) Field of Classification Search
CPC ........................ B60G 21/007; B60G 2300/122; B62K 5/027; B62K 5/10; B62K 5/06; B62D 9/02

USPC .................................................. 280/124.103
See application file for complete search history.

(56) References Cited

U.S. PATENT DOCUMENTS

| | | | | |
|---|---|---|---|---|
| 5,240,267 A | * | 8/1993 | Owsen .................... | B62K 5/10 280/124.103 |
| 5,730,453 A | * | 3/1998 | Owsen .................... | B62K 5/10 280/124.103 |
| 7,063,179 B2 | * | 6/2006 | Takayanagi ............ | B62K 5/027 180/210 |

(Continued)

FOREIGN PATENT DOCUMENTS

| | | |
|---|---|---|
| EP | 1378427 A1 | 1/2004 |
| EP | 3412548 A1 | 12/2018 |

(Continued)

*Primary Examiner* — Paul N Dickson
*Assistant Examiner* — Caitlin Anne Miller
(74) *Attorney, Agent, or Firm* — WPAT, PC

(57) ABSTRACT

A coupling mechanism for a vehicle body having mutually pivotable first and second frames comprises an axle fixed to the first frame, a rotating member fixed to the second frame and rotatably mounted around the axle, and a torsional resistance module that is actuated when the axle and the rotating member rotate relative to each other. The torsional resistance module includes two force magnifying mechanisms connected between the first frame and the rotating member. A buffering member is disposed between the force magnifying mechanisms. When the buffering member is pressed, a relative torsional resistance is provided between the first and second frames through transmission of the force magnifying mechanisms. The torsional resistance has a non-linear relationship with a relative rotational angle between the first and second frames.

10 Claims, 8 Drawing Sheets

(56) References Cited

U.S. PATENT DOCUMENTS

| | | | | |
|---|---|---|---|---|
| 8,141,890 B2* | 3/2012 | Hughes | ............... | B60G 21/007 |
| | | | | 280/124.103 |
| 8,485,541 B2* | 7/2013 | Pozio | ...................... | B62K 5/10 |
| | | | | 280/124.136 |
| 8,814,186 B1* | 8/2014 | Rinda | ..................... | B62K 5/06 |
| | | | | 280/93.504 |

FOREIGN PATENT DOCUMENTS

| | | |
|---|---|---|
| JP | S5157453 U | 5/1976 |
| JP | S60176875 A | 9/1985 |
| TW | I549857 | 9/2016 |
| TW | M550707 | 10/2017 |

\* cited by examiner

COUPLING MECHANISM FOR A VEHICLE BODY

CROSS REFERENCE TO RELATED APPLICATION

The application claims the benefit of Taiwan application serial No. 108126029, filed on Jul. 23, 2019, and the subject matter of which is incorporated herein by reference.

BACKGROUND OF THE INVENTION

1. Field of the Invention

The present invention relates to a vehicle component and, more particularly, to a vehicle body coupling mechanism mounted between front and rear frames that are pivotable relative to each other.

2. Description of the Related Art

Early tricycles have an integral frame and, thus, tend to roll when turning around a corner. The tricycles may overturn when the roll angle is too large. Manufactures separate a tricycle frame into a front frame and a rear frame pivotably connected to the front frame, such that the rear frame will not roll together with the front frame while the front frame is moving around a corner and rolling, reducing overturning risks. Furthermore, a vehicle body coupling mechanism is disposed between the mutually pivotable front and rear frames to enhance the riding comfort and riding convenience. The vehicle body coupling mechanism provides a relative torsional resistance between the front and rear frames, such that the feet of the rider do not have to touch the ground for preventing the front frame from tipping when the vehicle is running at a low speed or stops. The rear frame is less easily to overturn due to the centrifugal force while the vehicle is turning around a corner at a high speed. Furthermore, the front frame can maintain in an upright position without tipping when the rider leaves the vehicle. Furthermore, after the front and rear frames overcome the torsional resistance and pivot relative to each other, the vehicle body coupling mechanism provides a reactive force when the roll force becomes smaller, creating assistance in re-centering the rolled front and rear frames. Examples of such a vehicle body coupling mechanism have been disclosed in Taiwan Patent Publication No. 1549857 and European Patent Publication No. 3412548 (Taiwan Patent Publication No. 1617483).

However, conventional vehicle body coupling mechanisms generally include a plurality of links, a plurality of sliding blocks, and a plurality of shock absorbers, resulting in a heavy overall weight and troublesome installation. Of more importance, conventional vehicle body coupling mechanisms include left and right shock absorbers to provide a torsional resistance for left roll or right roll. However, it is extremely difficult to adjust the left and right shock absorbers to provide the same torsional resistance. Thus, in the parking state, the front frame cannot maintain an upright state relative to the rear frame due to different torsional resistances at two sides, adversely affecting the riding comfort.

Thus, a need exists for improvement to the conventional vehicle body coupling mechanisms.

SUMMARY OF THE INVENTION

To solve the above problems, an objective of the present invention is to provide a vehicle body coupling mechanism having a simple structure to significantly reduce the overall weight and improving the installation efficiency.

Another objective of the present invention is to provide a vehicle body coupling mechanism including two force magnifying mechanisms at left and right sides. The two force magnifying mechanisms are connected to the same buffering member that is compressed by the swaying displacement difference of the two force magnifying mechanisms while turning around a corner. The buffering member transmits and provides a torsional resistance to the first frame and the second frame.

A further objective of the present invention is to provide a vehicle body coupling mechanism having components of a better disposition relationship or ratio to provide better riding comfort.

According to the moving direction of the vehicle, the Y direction indicates the front and rear directions, the X direction indicates the left and right directions, and the Z direction indicates the up and down directions (or the top and bottom directions). Furthermore, when the terms "inner", "outer", "side", and similar terms are used herein, it should be understood that these terms have reference only to the structure shown in the drawings as it would appear to a person viewing the drawings and are utilized only to facilitate describing the invention, rather than restricting the invention.

As used herein, the term "one" or "an" for describing the number of the elements and members of the present invention is used for convenience, provides the general meaning of the scope of the present invention, and should be interpreted to include one or at least one. Furthermore, unless explicitly indicated otherwise, the concept of a single component also includes the case of plural components.

As used herein, the term "coupling", "join", "assembly", or similar terms is used to include separation of connected members without destroying the members after connection or inseparable connection of the members after connection. A person having ordinary skill in the art would be able to select according to desired demands in the material or assembly of the members to be connected.

As used herein, the term "connection", "pivotal connection", or similar terms is used to include direct connection or pivotal connection between two components as well as indirect connection or pivotal connection between the two components via another component, which can be selected by one having ordinary skill in the art according to the installation needs.

A coupling mechanism according to the present invention is provided for a vehicle body having a first frame and a second frame pivotable relative to the first frame. The coupling mechanism comprises an axle, a rotating member, and a torsional resistance module. The axle is configured to be fixed to the first frame. The rotating member is configured to be fixed to the second frame and is rotatably mounted around the axle. The torsional resistance module is configured to be actuated when the axle and the rotating member rotate relative to each other. The torsional resistance module includes two force magnifying mechanisms. Each of the two force magnifying mechanisms is connected between the first frame and the rotating member. A buffering member is disposed between the two force magnifying mechanisms. When the buffering member is pressed, a relative torsional resistance is provided between the first frame and the second frame through transmission of the two force magnifying mechanisms. The torsional resistance has a non-linear relationship with a relative rotational angle between the first frame and the second frame.

Thus, the coupling mechanism for a vehicle body according to the present invention has simple components to reduce the overall weight, reduce the costs, and improve the installation efficiency. Furthermore, by connecting the two force magnifying mechanisms at the left and right sides to the same buffering member and by compressing the buffering member with the swaying displacement difference of the two force magnifying mechanisms, the buffering member transmits and provides the same torsional resistance to the two force magnifying mechanisms. This assures the front and rear frames to stand in an upright position relative to each other not only in the parking state. During the relative pivotal movement between the front and rear frames, no matter whether the left roll or right roll, the buffering member can provide the same feedback of a suitable sense of the road condition under the same inclination angle, allowing the rider to suitably adjust the sideway force to thereby enhance the driving safety while avoiding adverse influence on the riding comfort resulting from different maneuvering conditions at the left and right sides.

In an example, each of the two force magnifying mechanisms includes a rocker arm and a connecting member. Each rocker arm includes a first end pivotably connected to the first frame and a second end pivotably connected to the buffering member. Each connecting member includes a first end pivotably connected between the first end and the second end of an associated rocker arm and a second end pivotably connected to the rotating member. Thus, each of the two force magnifying mechanisms has a simple structure to reduce the overall weight, to reduce the manufacturing costs, and to improve the installation efficiency.

In an example, the first end of each rocker arm is pivotably connected the first frame about a first pivotal axis. The second end of each rocker arm is pivotably connected the buffering member about a second pivotal axis. Each first pivotal axis is spaced from the connecting member by a first shortest distance. A reference line passes through the second pivotal axes of the two force magnifying mechanisms. Each first pivotal axis is spaced from the reference line by a second shortest distance. A ratio of the second shortest distance to the first shortest distance is in a range of 1:1 to 5:1, preferably 2:1 to 4.5:1. Thus, the coupling mechanism for a vehicle body can provide the vehicle with better riding comfort.

In an example, the axle has a rotating axis. In each of the two force magnifying mechanisms, the connecting member is pivotably connected to the rotating member about a fourth pivotal axis, and a first reference line passes through the rotating axis and the fourth pivotal axis. The rocker arm is pivotably connected to the first frame about a first pivotal axis. A second reference line passes through the first pivotal axis and the fourth pivotal axis. The rocker arm is pivotably connected to the connecting member about a third pivotal axis. A third reference line passes through the third pivotal axis and the fourth pivotal axis. The third reference line is intermediate the first reference line and the second reference line. Thus, the coupling mechanism for a vehicle body can provide the vehicle with better riding comfort.

In an example, in each of the two force magnifying mechanisms, the rocker arm is pivotably connected to the buffering member about a second pivotal axis, and the third pivotal axis is more adjacent to the first pivotal axis than to the second pivotal axis. Thus, the coupling mechanism for a vehicle body can provide the vehicle with better riding comfort.

In an example, each rocker arm is arcuate and includes a concave face and a convex face, and the concave face faces the buffering member. Thus, each rocker arm is prevented from interfering with the buffering member while reducing the height of each of the two force magnifying mechanisms, providing a better design ratio.

In an example, each rocker arm includes two protruding seats on a front side and a rear side thereof, respectively. Each connecting member includes two pivotal plates pivotably connected to the two protruding seats, respectively. Thus, the two pivotal plates can jointly actuate the associated rocker arm in the front/rear direction, improving the movement stability of the two force magnifying mechanisms.

In an example, the torsional resistance module further includes an adjusting member. The two force magnifying mechanisms are pivotably connected to the adjusting member to indirectly connect with the first frame. Thus, the adjusting member can adjust the bias of the rocker arms against the buffering member, and the adjustment can be proceeded according to different riding demands or habits, improving the riding comfort.

In an example, the adjusting member includes a first positioning portion coupled to the first frame, a second positioning portion coupled to the first positioning portion and movable relative to the first positioning portion in a vertical direction, and a pivotal seat connected to the second positioning portion. The first end of each rocker arm is pivotably connected to the pivotal seat. Thus, the adjusting member has a simple structure to reduce the manufacturing costs and to improve the installation efficiency.

In an example, the second positioning portion includes at least one stud extending through the first positioning portion. At least one nut having a number corresponding to a number of the at least one stud is coupled with the at least one stud. The at least one nut is rotatable to adjust a gap between the first positioning member and the second positioning member to adjust a bias of the rocker arms against the buffering member. Thus, the adjusting member can adjust the bias of the rocker arms against the buffering member by a simple structure to reduce the manufacturing costs and to improve the installation efficiency.

The present invention will become clearer in light of the following detailed description of illustrative embodiments of this invention described in connection with the drawings.

DETAILED DESCRIPTION OF THE INVENTION

Figure 1:
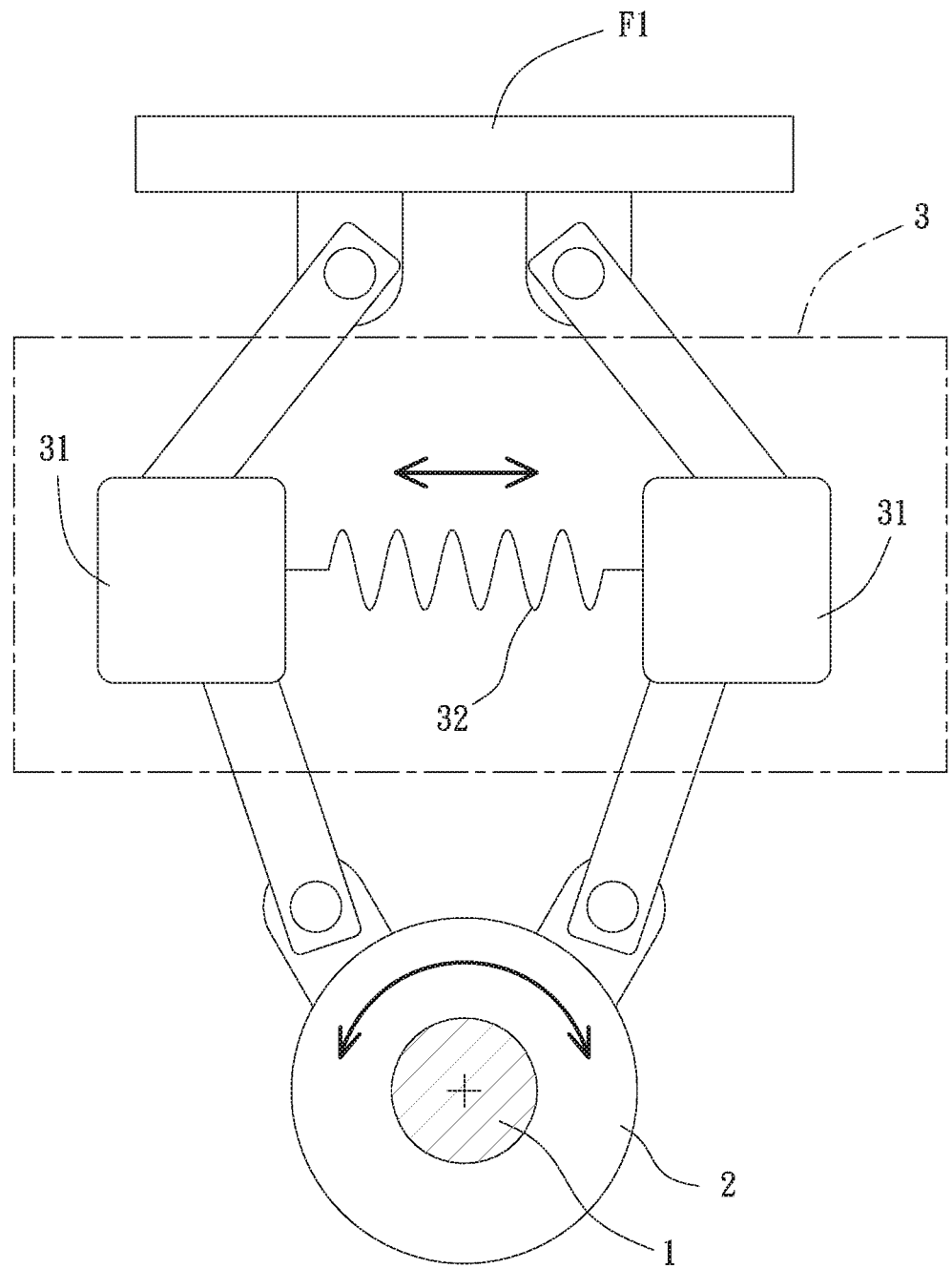
FIG. 1 is a diagrammatic view of a coupling mechanism for a vehicle body of an embodiment according to the present invention.
Figure 2:
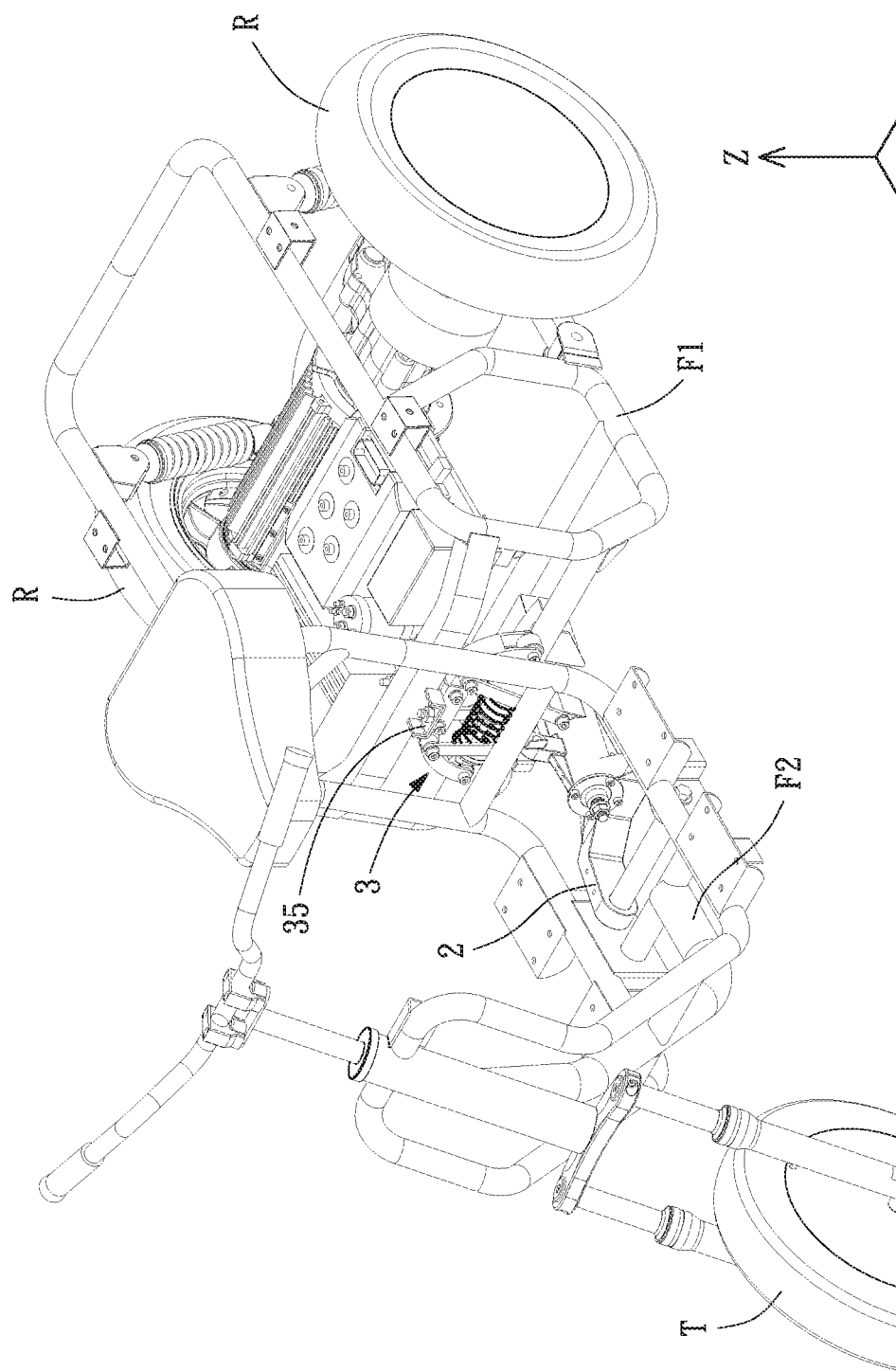
FIG. 2 is a perspective view of a vehicle on which the coupling mechanism for a vehicle body of the embodiment according to the present invention is mounted.

With reference to FIGS. 1 and 2, a coupling mechanism for a vehicle body of an embodiment according to the present invention can be mounted to a vehicle having first frame F1 and a second frame F2 pivotable relative to the first frame F1, with the first and second frames F1 and F2 mounted to front and rear portions of the vehicle. The number of tires of the vehicle is not limited. In this embodiment, the coupling mechanism is installed on a tricycle having a front wheel T and two rear wheels R. The present invention is not limited in this regard.

Specifically, the coupling mechanism for a vehicle body according to the present invention includes an axle 1, a rotating member 2, and a torsional resistance module 3. The axle 1 is configured to be fixed to the first frame F1. The rotating member 2 is configured to be fixed to the second frame F2 and is rotatably mounted around the axle 1. The torsional resistance module 3 includes two force magnifying mechanisms 31. Each of the two force magnifying mechanisms 31 is connected between the first frame F1 and the rotating member 2. A buffering member 32 is disposed between the two force magnifying mechanisms 31. Thus, when the first frame F1 and the second frame F2 roll leftwards or rightwards relative to each other, the roll movement can be converted into a relative rotational movement between the rotating member 2 and the axle 1, such that the two force magnifying mechanisms 31 sway relative to each other. Furthermore, the difference between the swaying displacements of the two force magnifying mechanisms 31 compresses the buffering member 32 to provide a relative torsional resistance between the first frame F1 and the second frame F2. The torsional resistance can have a non-linear relationship with a relative rotating angle between the first frame F1 and the second frame F2 (see FIG. 7). Furthermore, the working curve of the coupling mechanism for a vehicle body can be varied by adjusting the bias against the buffering member 32.

Figure 3:
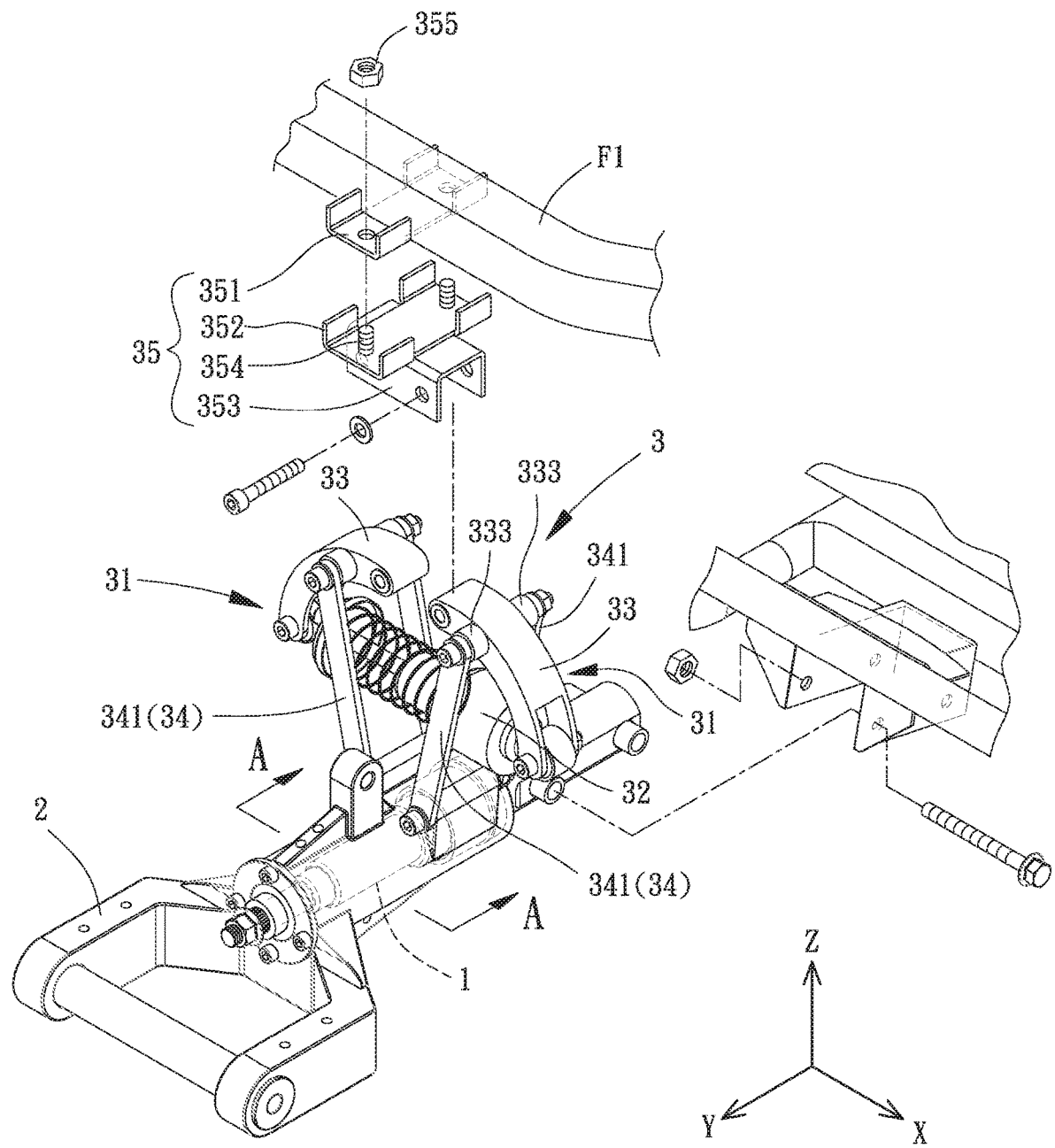
FIG. 3 is an exploded, perspective view of the coupling mechanism for a vehicle body of the embodiment according to the present invention.

With reference to FIGS. 2 and 3, based on the above technical concept, the present invention is described by way of an embodiment in which the rear frame is the first frame F1 and the front frame is the second frame F2. However, the present invention is not limited in this regard. The coupling mechanism for a vehicle body can be installed in a reverse manner in other embodiments.

In this embodiment, the axle 1 can substantially be fixed to a center of the first frame F1, and the rotating member 2 can be rotatably mounted around an end of the axle 1 remote to the first frame F1. The outlines and the detailed structures of the axle 1 and the rotating member 2 can be adjusted and varied according to needs, which can be appreciated by one having ordinary skill in the art and, thus, will not be described in detail and should not be limited by the type shown in the drawings of the present invention.

Figure 4:
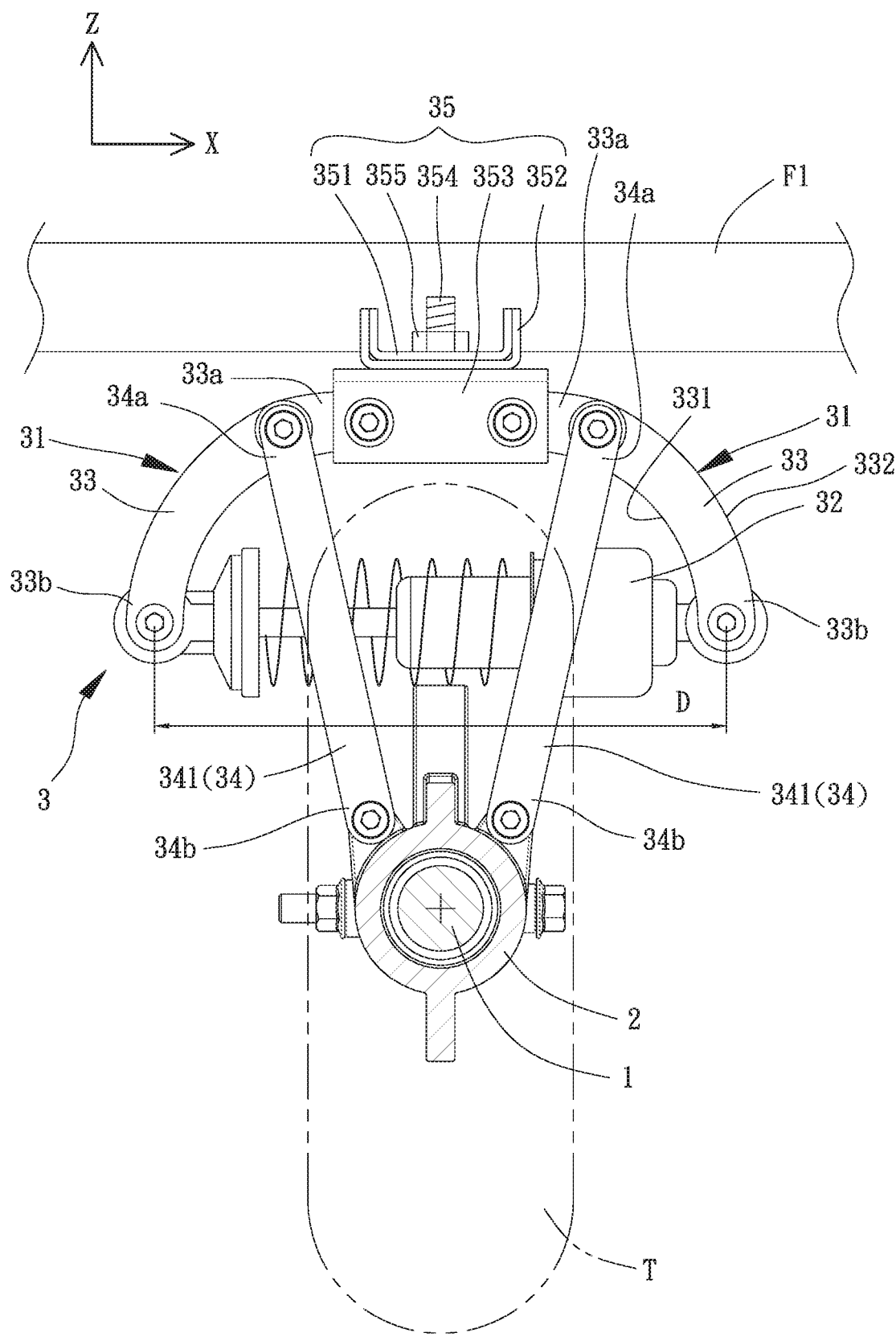
FIG. 4 is a diagrammatic view of the coupling mechanism for a vehicle body of the embodiment according to the present invention.

With reference to FIGS. 3 and 4, the torsional resistance module 3 is configured to be actuated when the axle 1 and the rotating member 2 rotate relative to each other. In this embodiment, the torsional resistance module 3 includes two force magnifying mechanisms 31 that can be in lateral symmetry. Each of the two force magnifying mechanisms 31 is directly or indirectly connected (such as by pin connection) between the first frame F1 and the rotating member 2. A buffering member 32 is connected (such as by pin connection) between the two force magnifying mechanisms 31, such that the two force magnifying mechanisms 31 can jointly provide the bias against the buffering member 32. When the buffering member 32 is pressed, a relative torsional resistance is provided between the first frame F1 and the second frame F2 through transmission of the two force magnifying mechanisms 31, and the torsional resistances on two sides are identical.

The buffering member 32 can be a damper, a shock absorber, or a damping shock absorber, which is not limited in the present invention. Each of the two force magnifying mechanisms 31 includes a rocker arm 33 and a connecting member 34. Each rocker arm 33 includes a first end 33a in direct or indirect pivotal connection with the first frame F1 and a second end 33b pivotably connected to the buffering member 32. Each connecting member 34 includes a first end 34a pivotably connected between the first end 33a and the second end 33b of an associated rocker arm 33 and a second end 34b in direct or indirect pivotal connection with the rotating member 2.

Each rocker arm 33 can be arcuate and includes a concave face 331 and a convex face 332. The concave face 331 faces the buffering member 32. Thus, each rocker arm 33 is prevented from interfering with the buffering member 32 while reducing the height of each of the two force magnifying mechanisms 31 in the Z direction, providing a better design ratio. Furthermore, each rocker arm 33 includes two protruding seats 333 on a front side and a rear side thereof in the Y direction, respectively. In this embodiment, each connecting member 34 includes two pivotal plates 341 pivotably connected to the two protruding seats 333, respectively. Thus, the two pivotal plates 341 can jointly actuate the associated rocker arm 33 in the front/rear direction, improving the movement stability of the two force magnifying mechanisms 31.

Figure 5:
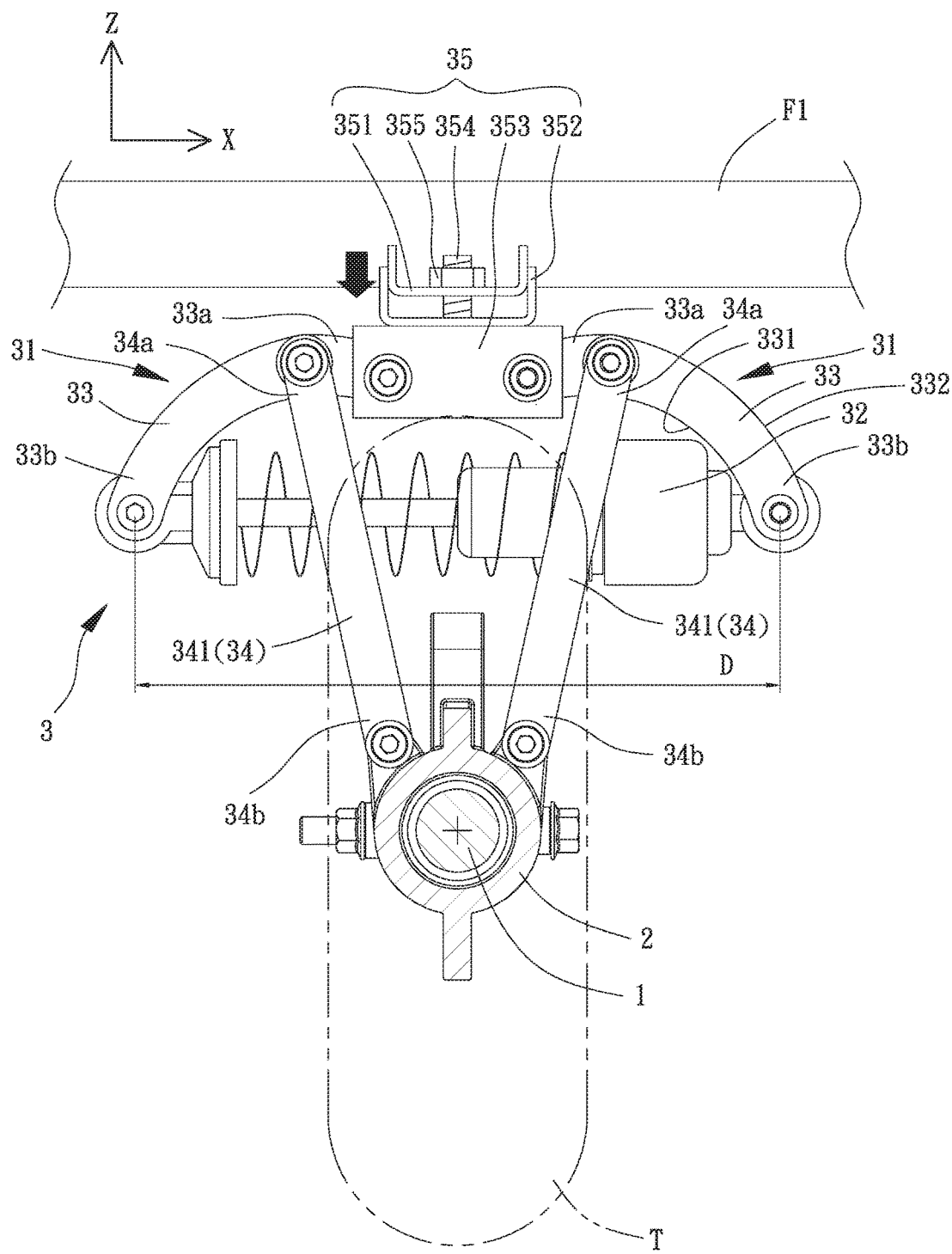
FIG. 5 is a diagrammatic side view of the coupling mechanism for a vehicle body of the embodiment according to the present invention, illustrating adjustment of the bias against a buffering member through use of an adjusting member.

With reference to FIGS. 3 and 5, it is worth noting that the torsional resistance module 3 of this embodiment can further include an adjusting member 35. The two force magnifying mechanisms 31 are pivotably connected to the adjusting member 35 to indirectly connect with the first frame F1. Specifically, the adjusting member 35 includes a first positioning portion 351 coupled to the first frame F1, a second positioning portion 352 coupled to the first positioning portion 351 and movable relative to the first positioning portion 351 in a vertical direction, and a pivotal seat 353 connected to the second positioning portion 352. The first end 33a of each rocker arm 33 is pivotably connected to the pivotal seat 353. Preferably, the second positioning portion 352 includes at least one stud 354 extending through the first positioning portion 351. At least one nut 355, whose number corresponds to the number of the at least one stud 354, is coupled with the at least one stud 354.

Thus, the at least one nut 355 can be rotated to adjust a gap between the first positioning member 351 and the second positioning member 352. Thus, the first ends 33a of the rocker arms 33 can be pressed or lifted simultaneously by the pivotal seat 353 to move the second ends 33b of the rocker arms 33 towards or away from each other, thereby adjusting an adjustable spacing D between the second ends 33b of the rocker arms 33. Thus, the bias of the rocker arms 33 against the buffering member 32 is adjusted. Namely, the larger the adjustable spacing D between the second ends 33b of the rocker arms 33, the smaller the bias of the rocker arms 33 against the buffering member 32. The torsional resistance provided by the buffering member 32 is smaller to increase the steering maneuverability of the vehicle is better, but the re-centering torque is smaller. On the contrary, the smaller the adjustable spacing D between the second ends 33b of the rocker arms 33, the larger the bias of the rocker arms 33 against the buffering member 32. The torsional resistance provided by the buffering member 32 is larger to increase the re-centering torque to thereby increase the anti-overturning ability of the rear frame (the first frame F1 in this embodiment). Accordingly, the adjustment can be proceeded according to different riding demands or habits.

In another embodiment, the first end 33a of each rocker arm 33 can be directly pivoted to the first frame F1, such that the bias of the rocker arms 33 against the buffering member 32 is fixed and not adjustable. The structure of the torsional resistance module 3 is further simplified to reduce the manufacturing costs and to enhance the assembling efficiency. Thus, the adjusting member 35 can be optionally mounted according to demands, which can be appreciated by one having ordinary skill in the art and should not be limited by the type disclosed in the drawings of the present invention.

With reference to FIGS. 2 and 4, based on the above structure, the vehicle with the coupling mechanism for a vehicle body according to the present invention provides the anti-torsional resistance by the buffering member 32, such that first frame F1 and the second frame F2 will not easily pivot relative to each other. Furthermore, the torsional resistance against the left roll or right roll is provided by the same buffering member 32, such that when the vehicle is in the parking state, the front frame (the second frame F2 in this embodiment) can maintain the upright position instead of tipping relative to the rear frame (the first frame F1 in this embodiment) without the need of holding the front frame. Furthermore, the front frame can stand upright (not tilted) relative to the rear frame. Furthermore, when the vehicle is running at a low speed or stops, the feet of the rider do not have to touch the ground for preventing the front frame from tipping. When the vehicle is turning around a corner at a high speed, the rear frame can move stably and does not easily overturn under the action of centrifugal force.

Figure 6:
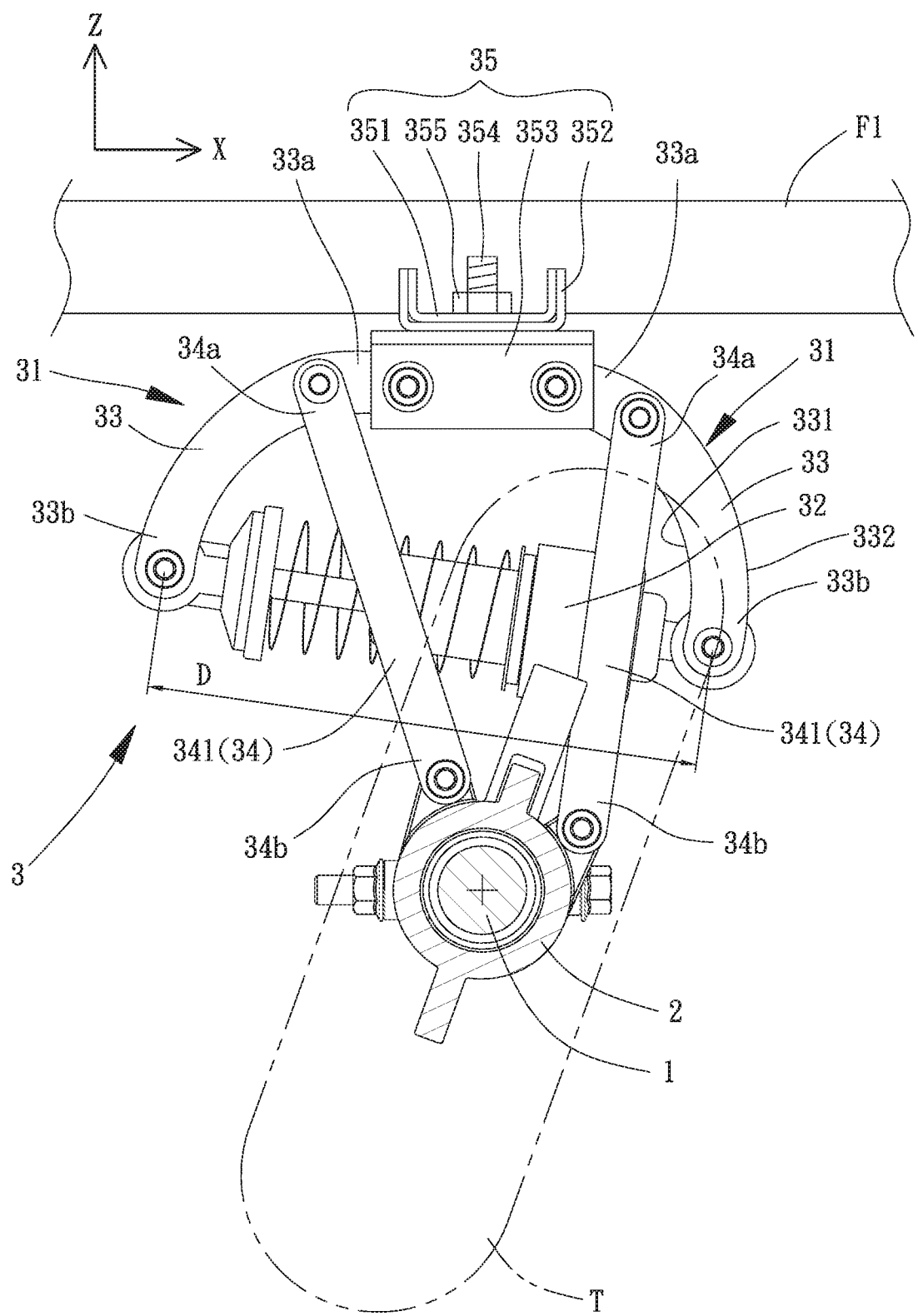
FIG. 6 is a diagrammatic view of the coupling mechanism for a vehicle body of the embodiment according to the present invention in a roll state.

With reference to FIGS. 2 and 6, on the other hand, when the vehicle with the coupling mechanism for a vehicle body according to the present invention is about to turn around a corner, the rider can apply a sideway force to the front frame (the second frame F2 in this embodiment) to roll the front frame relative to the rear frame (the first frame F1 in this embodiment). Due to provision of the axle 1 and the rotating member 2, the sideway movement can be converted into a local rotational movement between the first frame F1 and the second frame F2. Taking left roll of the second frame F2, after the sideway force overcomes the torsional resistance of the buffering member 32, the rotating member 2 rotates relative to the axle 1 and interlocks the second ends 34b of the connecting members 34 of the two force magnifying mechanisms 31 to rotate clockwise (according to the drawing direction), thereby actuating the rocker arms 33 through the connecting members 34. Thus, the two force magnifying mechanisms 31 can sway relative to each other, and the difference between the swaying displacements of the two force magnifying mechanisms 31 compresses the buffering member 32 to reduce the adjustable spacing D between the rocker arms 33. The buffering member 32 is compressed to provide a relative torsional resistance between the first frame F1 and the second frame F2 and to store the force for assisting in re-centering of the second frame F2. At the same time, the buffering member 32 filters high frequency vibrations of the first frame F1 and reduces the left roll speed of the second frame F2, avoiding discomfort to the rider resulting from fast left roll of the second frame F2. Likewise, when the second frame F2 rolls rightwards, the two force magnifying mechanisms 31 proceeds opposite movements.

It is noted that during the roll of the second frame F2, the reactive force provided by the buffering member 32 provides a sensation of feedback of force to the rider. Thus, the rider obtains a suitable sense of the road condition to serve as a reference for adjusting the sideway force, improving the driving safety. Furthermore, since the buffering member 32 is simultaneously pressed by the two force magnifying mechanisms 31, the same torsional resistance can be provided during left roll or right roll. Thus, no matter whether the rider applies a sideway force to the second frame F2 for left roll or right roll, the feedback sensation is the same in the same inclination angle, avoiding discomfort riding caused by different control situations at the left and right sides.

Figure 7:
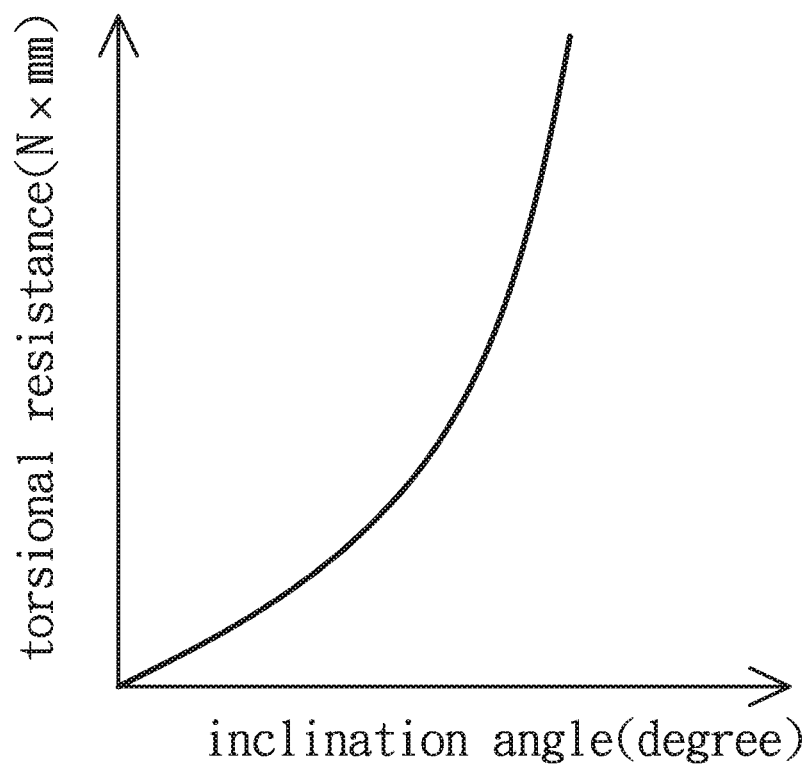
FIG. 7 is a diagram illustrating a working curve of the coupling mechanism for a vehicle body of the embodiment according to the present invention.

Furthermore, with reference to FIGS. 2 and 7, to further enhance the vehicle maneuverability and riding comfort, the relative inclination angle between the first frame F1 and the second frame F2 (the relative rotational angle between the axle 1 and the rotating member 2 in this embodiment) has a non-linear relationship with the torsional resistance (the relationship curve is non-linear). Namely, when the inclination angle is small (such as smaller than 15 degrees), the torsional resistance is smaller and increases slowly to avoid riding discomfort resulting from oversensitivity to the inclination angle. When the inclination angle is large (such as larger than or equal to 15 degrees), the torsional resistance becomes larger and increases faster, such that the rider can smoothly turn around a corner and re-center after turning, preventing the rider from tipping due to excessive rolling while turning around a corner. Note that FIG. 7 merely illustrates the trend of the working curve of the coupling mechanism and its non-linearity and should not be used to limit the relative numerical values of the inclination angle and the torsional resistance.

Figure 8:
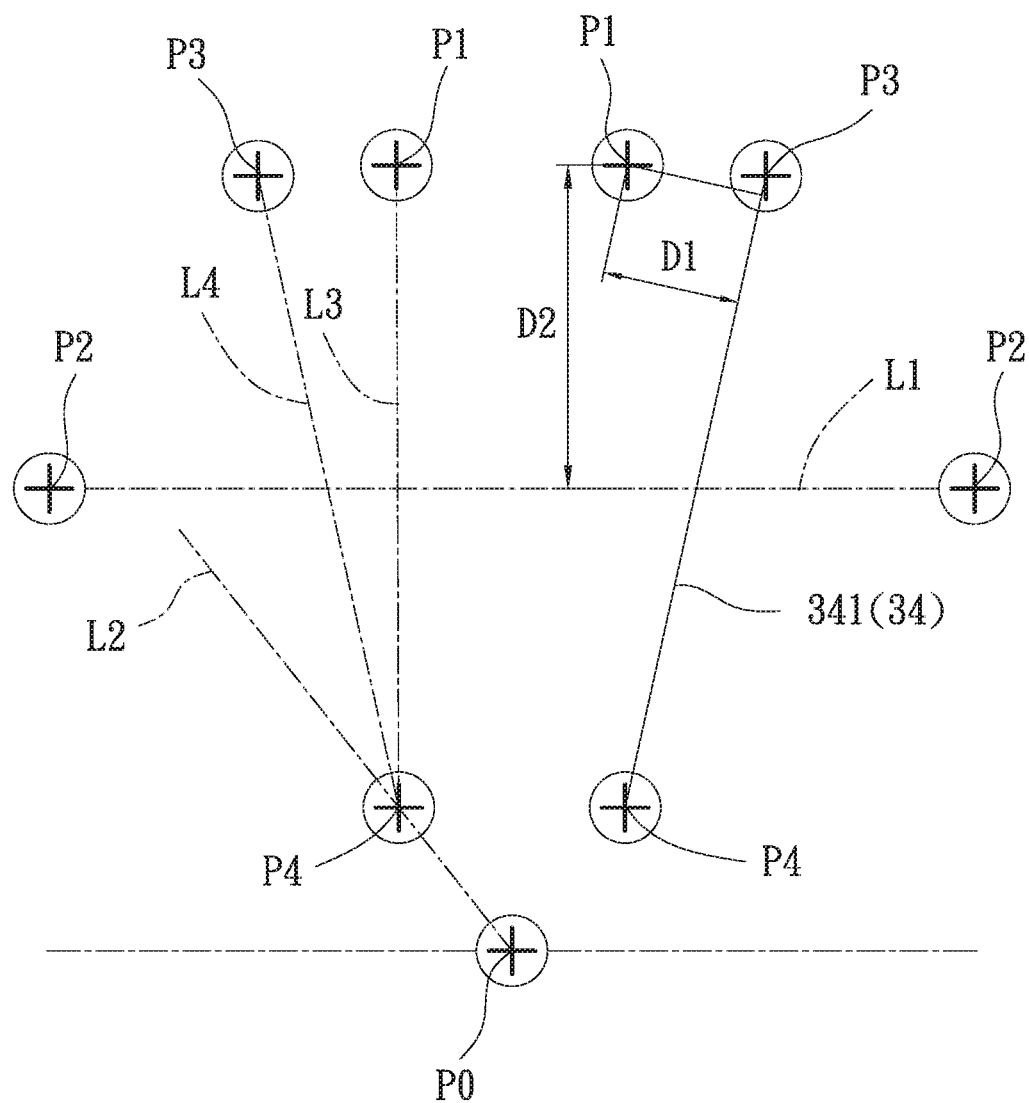
FIG. 8 is a diagrammatic view illustrating disposition of components of the coupling mechanism for a vehicle body of the embodiment according to the present invention.

To provide better riding comfort, the coupling mechanism for a vehicle body of this embodiment is provided with components of the following disposition relationship or ratio. With reference to FIGS. 4 and 8, the axle 1 has a rotating axis P0. The first end 33a of each rocker arm 33 is pivotably connected the first frame F1 about a first pivotal axis P1, and the second end 33b of each rocker arm 33 is pivotably connected the buffering member 32 about a second pivotal axis P2. Each rocker arm 33 is pivotably connected to an associated connecting member 34 about a third pivotal axis P3. Each connecting member 34 is pivotably connected to the rotating member 2 about a fourth pivotal axis P4. A reference line L1 passes through the second pivotal axes P2 of the two force magnifying mechanisms 31. In each of the two force magnifying mechanisms 31, a first reference line L2 passes through the rotating axis P0 and the fourth pivotal axis P4, a second reference line L3 passes through the first pivotal axis P1 and the fourth pivotal axis P4, and a third reference line L4 passes through the third pivotal axis P3 and the fourth pivotal axis P4.

In a non-restrictive example, each first pivotal axis P1 is spaced from the associated connecting member 34 by a first shortest distance D1, each first pivotal axis P1 is spaced from the reference line L1 by a second shortest distance D2, and a ratio of the second shortest distance D2 to the first shortest distance D1 is in a range of 1:1 to 5:1, preferably 2:1 to 4.5:1. Preferably, the third reference line L4 is intermediate the first reference line L2 and the second reference line L3. More preferably, the third pivotal axis P3 is more adjacent to the first pivotal axis P1 than to the second pivotal axis P2.

In view of the foregoing, the coupling mechanism for a vehicle body according to the present invention has simple components to reduce the overall weight, reduce the costs, and improve the installation efficiency. Furthermore, by connecting the two force magnifying mechanisms 31 at the left and right sides to the same buffering member 32 and by compressing the buffering member 32 with the swaying displacement difference of the two force magnifying mechanisms 31, the buffering member 32 transmits and provides the same torsional resistance to the two force magnifying mechanisms 31. This assures the front and rear frames to stand in an upright position relative to each other not only in the parking state. During the relative pivotal movement between the front and rear frames, no matter whether the left roll or right roll, the buffering member 32 can provide the same feedback of a suitable sense of the road condition under the same inclination angle, allowing the rider to suitably adjust the sideway force to thereby enhance the driving safety while avoiding adverse influence on the riding comfort resulting from different maneuvering conditions at the left and right sides.

Although the invention has been described in detail with reference to its presently preferable embodiments, it will be understood by one of ordinary skill in the art that various modifications can be made without departing from the spirit and the scope of the invention, as set forth in the appended claims.

What is claimed is:

1. A coupling mechanism for a vehicle body having a first frame and a second frame pivotable relative to the first frame, with the coupling mechanism comprising:
an axle configured to be fixed to the first frame;
a rotating member configured to be fixed to the second frame, wherein the rotating member is rotatably mounted around the axle; and
a torsional resistance module configured to be actuated when the axle and the rotating member rotate relative to each other;
wherein the torsional resistance module includes two force magnifying mechanisms, wherein each of the two force magnifying mechanisms is connected between the first frame and the rotating member, wherein a buffering member is disposed between the two force magnifying mechanisms, wherein when the buffering member is pressed, a relative torsional resistance is provided between the first frame and the second frame through transmission of the two force magnifying mechanisms, and wherein the torsional resistance has a non-linear relationship with a relative rotational angle between the first frame and the second frame; and
wherein the torsional resistance module further includes an adjusting member, wherein the two force magnifying mechanisms are pivotably connected to the adjusting member to indirectly connect with the first frame.

2. The coupling mechanism for the vehicle body as claimed in claim 1, wherein each of the two force magnifying mechanisms includes a rocker arm and a connecting member, wherein each rocker arm includes a first end pivotably connected to the first frame and a second end pivotably connected to the buffering member, and wherein each connecting member includes a first end pivotably connected between the first end and the second end of an associated rocker arm and a second end pivotably connected to the rotating member.

3. The coupling mechanism for the vehicle body as claimed in claim 2, wherein the adjusting member includes a first positioning portion coupled to the first frame, a second positioning portion coupled to the first positioning portion and movable relative to the first positioning portion in a vertical direction, and a pivotal seat connected to the second positioning portion, wherein the first end of each rocker arm is pivotably connected to the pivotal seat.

4. The coupling mechanism for the vehicle body as claimed in claim 3, wherein the second positioning portion includes at least one stud extending through the first positioning portion, wherein at least one nut having a number corresponding to a number of the at least one stud is coupled with the at least one stud, and wherein the at least one nut is rotatable to adjust a gap between the first positioning portion and the second positioning portion to adjust a bias of the rocker arms against the buffering member.

5. A coupling mechanism for a vehicle body having a first frame and a second frame pivotable relative to the first frame, with the coupling mechanism comprising:
an axle configured to be fixed to the first frame;
a rotating member configured to be fixed to the second frame, wherein the rotating member is rotatably mounted around the axle; and
a torsional resistance module configured to be actuated when the axle and the rotating member rotate relative to each other;
wherein the torsional resistance module includes two force magnifying mechanisms, wherein each of the two force magnifying mechanisms is connected between the first frame and the rotating member, wherein a buffering member is disposed between the two force magnifying mechanisms, wherein when the buffering member is pressed, a relative torsional resistance is provided between the first frame and the second frame through transmission of the two force magnifying mechanisms, and wherein the torsional resistance has a non-linear relationship with a relative rotational angle between the first frame and the second frame, wherein each of the two force magnifying mechanisms includes a rocker arm and a connecting member, wherein each rocker arm includes a first end pivotably connected to the first frame and a second end pivotably connected to the buffering member, and wherein each connecting member includes a first end pivotably connected between the first end and the second end of an associated rocker arm and a second end pivotably connected to the rotating member; and
wherein the first end of each rocker arm is pivotably connected the first frame about a first pivotal axis, wherein the second end of each rocker arm is pivotably connected the buffering member about a second pivotal axis, wherein each first pivotal axis is spaced from the connecting member by a first shortest distance, wherein a reference line passes through the second pivotal axes of the two force magnifying mechanisms, wherein each first pivotal axis is spaced from the reference line by a second shortest distance, and wherein a ratio of the second shortest distance to the first shortest distance is in a range of 1:1 to 5:1.

6. The coupling mechanism for the vehicle body as claimed in claim 5, wherein the ratio of the second shortest distance to the first shortest distance is in a range of 2:1 to 4.5:1.

7. The coupling mechanism for the vehicle body as claimed in claim 5, wherein the axle has a rotating axis, and wherein in each of the two force magnifying mechanisms, the connecting member is pivotably connected to the rotating member about a fourth pivotal axis, wherein a first reference line passes through the rotating axis and the fourth pivotal axis, wherein the rocker arm is pivotably connected to the first frame about a first pivotal axis, wherein a second reference line passes through the first pivotal axis and the fourth pivotal axis, wherein the rocker arm is pivotably connected to the connecting member about a third pivotal axis, wherein a third reference line passes through the third pivotal axis and the fourth pivotal axis, and wherein the third reference line is intermediate the first reference line and the second reference line.

8. The coupling mechanism for the vehicle body as claimed in claim 7, wherein in each of the two force magnifying mechanisms, the rocker arm is pivotably connected to the buffering member about a second pivotal axis, wherein the third pivotal axis is more adjacent to the first pivotal axis than to the second pivotal axis.

9. The coupling mechanism for the vehicle body as claimed in claim 5, wherein each rocker arm is arcuate and includes a concave face and a convex face, wherein the concave face faces the buffering member.

10. A coupling mechanism for a vehicle body having a first frame and a second frame pivotable relative to the first frame, with the coupling mechanism comprising:
  an axle configured to be fixed to the first frame;
  a rotating member configured to be fixed to the second frame, wherein the rotating member is rotatably mounted around the axle; and
  a torsional resistance module configured to be actuated when the axle and the rotating member rotate relative to each other;
  wherein the torsional resistance module includes two force magnifying mechanisms, wherein each of the two force magnifying mechanisms is connected between the first frame and the rotating member, wherein a buffering member is disposed between the two force magnifying mechanisms, wherein when the buffering member is pressed, a relative torsional resistance is provided between the first frame and the second frame through transmission of the two force magnifying mechanisms, and wherein the torsional resistance has a non-linear relationship with a relative rotational angle between the first frame and the second frame;
  wherein each of the two force magnifying mechanisms includes a rocker arm and a connecting member, wherein each rocker arm includes a first end pivotably connected to the first frame and a second end pivotably connected to the buffering member, and wherein each connecting member includes a first end pivotably connected between the first end and the second end of an associated rocker arm and a second end pivotably connected to the rotating member; and
  wherein each rocker arm includes two protruding seats on a front side and a rear side thereof, respectively, wherein each connecting member includes two pivotal plates pivotably connected to the two protruding seats, respectively.

* * * * *